(United States Patent Office — 3,703,454 — Patented Nov. 21, 1972)

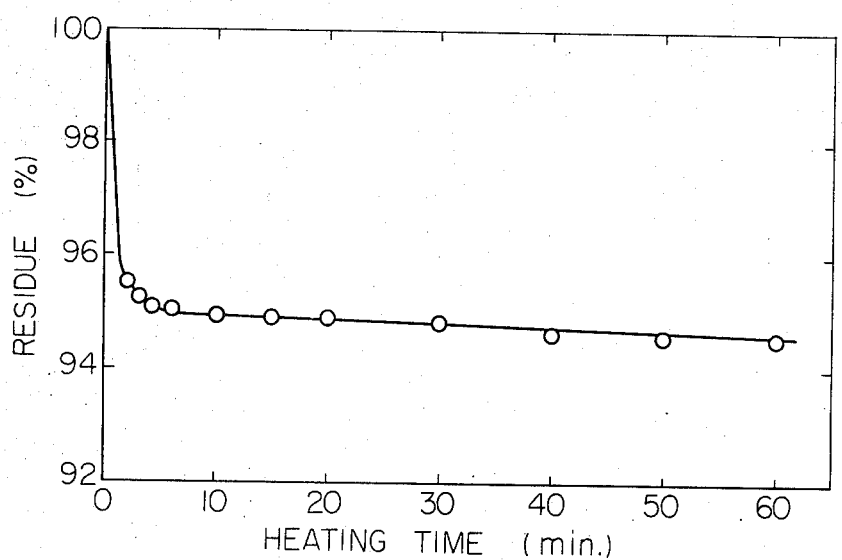
DECOMPOSITION CURVE
(MEASURED UNDER N2 GAS STREAM AT 222 °C)

3,703,454
POLYMERIZATION OF TETRAOXANE IN THE PRESENCE OF SULFUR AND SULFUR COMPOUNDS
Yoshiaki Nakase, Masaru Yoshida, and Akihiko Ito, Takasaki, Tadashi Iwai, Kanagawa, Koichiro Hayashi, Sapporo, Seizo Okamura, Kyoto, and Katsumi Kojima, Oimachi, Japan, assignors to Japan Atomic Energy Research Institute, Tokyo, Japan
Filed May 21, 1970, Ser. No. 39,213
Claims priority, application Japan, May 26, 1969, 44/41,277; Mar. 9, 1970, 45/19,615; Apr. 4, 1970, 45/28,362
Int. Cl. C08d 1/00; C08f 1/16, 3/40
U.S. Cl. 204—159.21                    16 Claims

ABSTRACT OF THE DISCLOSURE

In a process for polymerizing tetraoxane, sulfur or an organic sulfur compound which is admixed to tetraoxane acts as polymerization initiator for tetraoxane. Some of the organic sulfur compounds, such as thiiranes, thiocyanates and trithianoxides, improve heat stability of the produced polyoxymethylene remarkably.

BACKGROUND OF THE INVENTION

It is well known to polymerize formaldehyde, trioxane or tetraoxane by means of a cationic catalyst such as a Lewis acid or by irradiation of an ionizing radiation. However, the catalysts used in the conventional process are highly reactive and unstable, and therefore, they must be handled with extreme care. Furthermore, there remains a disadvantageous step in neutralizing a Lewis acid after the polymerization was completed. Radiation polymerization is disadvantageous in that the polymerization rate is low in general.

The polyoxymethylenes obtained by polymerizing formaldehyde, trioxane or tetraoxane by means of a known cationic catalyst such as a Lewis acid or an ionizing radiation are inadequate in thermal stability and are easily depolymerized. Therefore, these polymers require some additional stabilization treatment in order that they may be commercially practicable. According to a conventional process, a produced polyoxymethylene is further treated with acetic anhydride in order to acetylate the chain end thereof; or formaldehyde or trioxane is polymerized in the presence of one or more copolymerizable substances so that a thermally stable copolymer is obtained.

As processes employing a sulfur compound to produce thermally stable polyoxymethylene, the following inventions are known: German Pat. No. 1,176,862 corresponding to Japanese patent publication No. 42/7,631 (a process for polymerizing formaldehyde or its linear oligomer in the presence of a cyclic sulfur compound), British Pat. No. 989,942 (a process for producing a copolymer of trioxane with a cyclic sulfur compound and a cyclic oxygen compound) and British Pat. No. 1,036,992 (a process for producing a copolymer of trioxane and propylene sulfide). However, these are processes in which the acidic catalyst is used, and therefore the abovementioned disadvantages are incident to these processes.

This invention provides a process for producing polyoxymethylene in which the above-mentioned disadvantages are eliminated by using elementary sulfur or an organic sulfur compound as the additive and the polyoxymethylene are obtained in a short length of time at high yield. The sulfur or organic sulfur compounds used in this process are substantially neutral, and the process is commercially advantageous in that the additive can be handled without extreme care and need not be neutralized.

Further, when some organic sulfur compounds are employed in accordance with the invention of this application, the excellent heat stability of the produced polymer is achieved in addition to the above-mentioned advantage. That is, when a thiirane, a thiocyanate, an isothiocyanate, a trithianoxide or an ethylenethiourea is added to tetraoxane which is polymerized under heat applied, a thermally stable polyoxymethylene polymer is obtained in one step without any after-treatment for stabilization as mentioned above.

The invention of this application is different from the above-mentioned prior art processes in that neither formaldehyde nor its linear oligomers or trioxane is used as the starting material. As the polymerization of these materials is not initiated by sulfur or organic sulfur compounds employed in the present invention, employment of a Lewis acid or any other polymerization initiator or an ionizing radiation is indispensable.

SUMMARY OF THE INVENTION

This invention relates to a process for producing polyoxymethylene by polymerizing tetraoxane whereby said polymerization is carried out in the presence of an additive such as elementary sulfur or an organic sulfur compound and to a polyoxymethylene obtained thereby. Two or more species of the additives may, if desired, be used in this invention.

We have unexpectedly found that sulfur and some organic sulfur compounds act as polymerization initiator for tetraoxane as well as give thermal stability to the produced polymer, and that some organic sulfur compounds contribute to thermally stabilizing the produced polymer remarkably, and have completed this invention.

Analysis of a polyoxymethylene prepared by employing a thiocyanate, a thiirane or a trithianoxide according to this invention shows that a small amount of the organic sulfur compound was contained in the polymer. The excellent heat stability of the produced polymer is considered to be partly due to an organic sulfur compound contained in the produced polymer by way of copolymerization of tetraoxane and said compound and/or in the state of an organic sulfur compound chemically bonded with ends or stem of the polymer.

The organic sulfur compounds to be used in this invention include the following compounds. The examples of the divalent sulfur compounds are thioaldehydes (e.g., trithioformaldehyde, etc.), thioketones (e.g., methyl phenyl thioketone, etc.), thioalcohols (e.g., methyl mercaptan, ethyl mercaptan, methyl thioglycolate, etc.), thiocarbonic anhydrides (e.g., carbon disulfide, etc.), thiocarbonic ester (e.g., ethylene trithiocarbonate, etc.), thioethers (e.g., methyl sulfide, ethyl sulfide, dimethyl disulfide, tetrahydrothiophene, thiiranes (i.e. episulfide, etc.), thioamides (e.g., acetothioamide, etc.), thiourea and its derivatives (e.g., ethylenethiourea, methyl thiourea, etc.), thiocyanates (methyl thiocyanate, ethyl thiocyanate, etc.), isothiocyanates (e.g., methyl isothiocyanate, ethyl isothiocyanate, etc.), alkylxanthogenates (e.g., ethyl ethylxanthogenate, etc.). The examples of tetravalent or hexavalent sulfur compounds are sulfates (e.g., dimethyl sulfate, diethyl sulfate, etc.), sulfites (e.g., dimethyl sulfite, diethyl sulfite, glycol sulfite, etc.), alkyl sulfones (diethyl sulfone, etc.), alkylsulfoxides (e.g., dimethyl sulfoxide, etc.), sulfonium compounds (e.g., trimethyl sulfonium iodide, etc.), thiophene-deriatives-s-oxide (e.g., dihydrothiophene-1-dioxide, tetrahydrothiophene-1-oxide, tetrahydrothiophene-1-dioxide, etc.), dithiorane-derivatives-s-oxide (e.g., 1,3-dithioranedisulfone, γ-sultone, etc.), oxathian-derivatives-s-oxide (e.g., δ-sultone, 1,3-oxathian-1-dioxide, etc.), and trithianoxides (e.g., trimethylenetrisulfoxide, trimethylenetrisulfone, etc.).

The typical examples of thiiranes, thiocyanates, isothiocyanates and trithianoxides which are very useful for thermal stabilization of the produced polymers are shown below. Thiiranes include ethylene sulfide, propylene sulfide, 1-butene sulfide, 2-butene sulfide, isobutene sulfide, trimethylethylene sulfide, tetramethylethylene sulfide, cyclopentene sulfide, cyclohexene sulfide, 4-methylcyclohexene sulfide, cycloheptene sulfide, cyclooctene sulfide, styrene sulfide, 3-mercaptopropylene sulfide, 3-chloropropylene sulfide; and the thiocyanates include methyl thiocyanate, ethyl thiocyanate, propyl thiocyanate, isopropyl thiocyanate, butyl thiocyanate, isobutyl thiocyanate, amyl thiocyanate, isoamyl thiocyanate, allyl thiocyanate, benzyl thiocyanate, and phenyl thiocyanate; and the isothiocyanates include methyl isothiocyanate, ethyl isothiocyanate, n-propyl isothiocyanate, isopropyl isothiocyanate, n-butyl isothiocyanate, benzyl isothiocyanate and phenyl isothiocyanate; and the trithianoxides typically include trimethylenetrisulfoxide and trimethylenetrisulfone.

In the process of this invention, in addition to the use of the above-mentioned sulfur or sulfur compounds, the irradiation of an ionizing radiation can be utilized. The combined employment of sulfur or sulfur compounds and an ionizing radiation serves for improvement in the polymerization rate. The polymerization by way of said combined employment is essentially different from the normal radiation-induced polymerization, since the radiation-induced polymerization of tetraoxane without the additives can only proceed in solid phase; whereas in case of the combined employment the polymerization even in liquid phase is remarkably accelerated by irradiation. The useful radiations include alpha rays, beta rays, gamma rays, electron beam, X-ray, neutron beam, beams of heavy particles and combination thereof. An actinic light such as ultraviolet rays from a mercury lamp etc. can also be used.

In accordance with this invention, polymerization is carried out as follows. First, sulfur or a sulfur compound (hereinafter called "additive") is admixed to tetraxoane. When a rather volatile compound is used, the polymerization system is confined in a sealed vessel. Admixing can be carried out by various ways. In the case of solid phase polymerization, the additive is added to crystalline tetraoxane in the form of drops, spray or vapor, or the additive is melt-mixed with tetraoxane and solidified. In the liquid phase polymerization, the additive is added to the liquid phase containing tetraoxane, or it is admixed to tetraoxane and then the mixture is melted or dissolved into a solution. The amount of the additive to be used is $10^{-4}$–10% by weight on the basis of tetraoxane to be used, and preferably $10^{-3}$–5% by weight. When the additive is a solid substance or it is used in a low concentration, it is advantageous to use it in the form of a solution in a solvent inactive to both tetraoxane and the additive such as n-hexane or benzene etc. When light or a radiation is employed, whether the irradiation is carried out before or after admixing of the additive to tetraoxane, there is no difference in the effect. Namely, there are three ways for applying irradiation; the mixture of tetraoxane and additives is irradiated; tetraoxane is irradiated at first and then admixed with the additive; or the additive is irradiated at first and admixed with tetraoxane. When the in-source-polymerization is employed, the dose rate is in the range of $10^2$–$10^8$ rad./hr.; and in the case of the post-polymerization, the dose is $10^2$–$10^8$ rad. In the case of in-source polymerization (including light irradiation), the irradiation temperature is identical with that of polymerizaton. In the case of post-polymerzation (including light irradiation), the irradiation temperature must be within the range in which tetraoxane is in the solid state. When irradiation is carried out at a temperature higher than 30° C., in-source polymerization proceeds except for the case in which the irradiation time is very short. However, post-polymerization can, of course, be effected thereafter. Though the polymerization can be conducted at a temperature ranging from 30° to 150° C., desirable results are obtained when polymerization is carried out at 90° C. or higher temperatures. Even when the temperature of the heating bath is higher than the melting point of tetraoxane, polymerization may proceed in the solid state during temperature raise. There is no restriction, either, with respect to the atmosphere in which polymerization is carried out. That is, polymerization can be carried out either in air, vacuum or an inert gas. However, the polymerization rate is higher in the atmosphere containing oxygen than that not containing oxygen. The in-source polymerization means polymerization which proceeds during irradiation by means of an ionizing radiation or an actinic light. The post-polymerization means polymerization which proceeds after irradiation in the absence of the radiation source. The term "solid phase polymerization" referred to herein means polymerization carried out in the condition in which tetraoxane exists in the solid state (including dispersion), and "liquid phase polymerization" means polymerization carried out in the condition under which the system containing tetraoxane is in the liquid state. The solid phase polymerization, particularly at a temperature around 105° C., is preferably in view of obtaining the polymer with improved heat stability; since crystal structure of tetraoxane in the solid phase polymerization according to this invention has an effect upon the polymer structure in that fibrils of the polymer orientate in the direction of the $b$ axis of the crystal lattice of tetraoxane, and since the additive is uniformly distributed onto tetraoxane in the solid phase and the reaction of the additive is controlled by the geometric distribution of the additive rather than the reactivity ratio of tetraoxane and additive. Furthermore, powdery polymer is obtained directly from powdery monomer by the solid phase polymerization and stirring power of a polymerization reactor does not change very much throughout whole polymerization process even when the polymer yield attains almost 100%. After polymerization, the reaction mixture is washed with a solvent such as acetone, benzene, etc. which is a good solvent for both tetraoxane and the additive so that the produced polymer may be separated from the unreacted materials.

As seen in the following working examples, if suitable polymerization conditions are set up, polymer is obtained in almost 100% yield, and therefore the process of this invention is extremely advantageous from the commercial view in that no means for recovery of unreacted monomer is required.

BRIEF DESCRIPTION OF THE DRAWING

The attached figure shows the thermal decomposition curve of a polyoxymethylene, by which the thermal stability is determined as $K_{222}$.

DETAILED DESCRIPTION OF THE PREFERRED EMBODIMENTS

Now the invention is illustrated by way of working examples. These examples are included for better understanding of the invention and should not be taken as limiting the scope of the invention. The product of each of the examples is a white crystalline substance. The melting points of the polymers obtained according to the following examples range from 167 to 174° C. The viscosity number [$\eta$] is determined with respect to a solution in p-chlorophenol containing 2% α-pinene at 60° C. The thermal stability of the polymer is indicated as $K_{222}$ (percent/minute) which means average thermal decomposition rate when the polymer is heated at 222° C. for 1 hour under nitrogen stream. The attached figure illustrates the thermal decomposition curve of polyoxymethylene which was prepared according to Example 19 and is specified in line 4 from the bottom of Table 15. The amount of the additive is indicated in percentage on the basis of the weight of tetraoxane.

Example 1

Carbon disulfide was admixed to 1 gram of tetraoxane which has been purified by sublimation, and the mixture was polymerized by heating in a sealed ampoule. Then the reaction mixture was washed with acetone, and the polymer was dried at room temperature in vacuum for 24 hours. The results are shown in Table 1.

TABLE 1

| Polymerization conditions | | Results | |
|---|---|---|---|
| Temp. (° C.) | Time (hr.) | Yield (percent) | Viscosity [η] |
| Amount of $CS_2$ (percent): | | | |
| 3 | 90 | 2 | 4 | |
| 1 | 105 | 2 | 96 | 10 |
| 5 | 105 | 2 | 96 | >10 |
| 3 | 105 | 1 | 93 | >10 |
| 3 | 105 | 4 | 97 | >10 |
| 3 | ¹120 | 2 | 97 | 3.2 |

¹ Liquid phase.

Example 2

Methyl thiocyanate was admixed to 1 gram of tetraoxane purified by sublimation, and the mixture was polymerized by heating in a sealed ampoule. Then the reaction mixture was treated as in Example 1. The results are shown in Table 2.

TABLE 2

| Polymerization conditions | | Results | |
|---|---|---|---|
| Temp. (° C.) | Time (hr.) | Yield (percent) | Viscosity [η] |
| Amount of $CH_3SCN$ (percent): | | | |
| 3 | 90 | 2 | 6 | |
| 3 | ¹120 | 2 | 96 | 5.1 |

¹ Liquid phase.

Example 3

Dimethyl disulfide and trithiane were respectively admixed to 1 gram of tetraoxane, and the respective mixture was polymerized in a sealed ampoule after being subjected to gamma irradiation from Co–60, and the respective reaction mixture was treated as in Example 1. The results are shown in Table 3.

TABLE 3

| Polymerization conditions | | | | Results | |
|---|---|---|---|---|---|
| Irradiation | | | | | |
| Amount of additive (percent) | Dose (rad.) | Temp. (° C.) | Temp. (° C.) | Time (hrs.) | Yield (percent) | Viscosity [η] |
| Dimethyl disulfide (3) | 10⁶ | 25 | 105 | 2 | 61 | 1.5 |
| Do | | | 105 | 2 | 40 | 2.5 |
| Trithiane (3) | 10⁶ | 25 | 105 | 4 | 95 | 2.0 |
| Do | | | 105 | 4 | 15 | |
| Do | | | ᵃ120 | 2 | 21 | |
| Do | 10⁶ | 25 | 105 | 2 | 54 | 0.8 |

ᵃ Liquid phase.

Example 4

Various sulfur compounds were respectively admixed to 1 gram of tetraoxane and the respective mixture was polymerized in a sealed ampoule after irradiation with gamma rays as shown in Table 4, and the reaction mixture was treated as in Example 1. The results are shown in Table 4.

TABLE 4

| Polymerization conditions | | | | | Results | | |
|---|---|---|---|---|---|---|---|
| Additive | Amount of additive (percent) | Dose (rad.) | Temp. (° C.) | Time (hrs.) | Yield (percent) | $K_{222}$ | Viscosity [η] |
| Methyl thioglycolate | 3 | | 105 | 2 | 83 | | 0.6 |
| Methyl sulfide | 3 | | 105 | 2 | 32 | | 1.1 |
| Sulfur | 3 | | 105 | 2 | 16 | | |
| Thioacetamide | 3 | | 105 | 2 | 4 | | |
| Thiourea | 3 | | 105 | 2 | 4 | | |
| Tetrahydrothiophene | 3 | | 105 | 2 | 7 | | |
| Ethylene trithiocarbonate | 3 | | 105 | 24 | 73 | | 2.5 |
| Ethylenethiourea | 1 | 10⁵ | 105 | 24 | 20 | 0.10 | 2.9 |
| Do | 3 | 10⁵ | 105 | 24 | 21 | 0.09 | 3.6 |

Example 5

A 10% cyclohexane solution of the following various sulfur compounds was respectively added to 1 gram of tetraoxane purified by sublimation, and the respective mixture was polymerized in a sealed ampoule. The respective reaction mixture was treated as in Example 1. The results are shown in Table 5.

TABLE 5

| Polymerization conditions | | | | Results | |
|---|---|---|---|---|---|
| Additive | Amount of solution (μl.) | Temp. (° C.) | Time (hrs.) | Yield (percent) | Viscosity [η] |
| Carbon disulfide | 1 | 105 | 2 | 97 | >10 |
| Do | 5 | 105 | 2 | 96 | >10 |
| Methyl thiocyanate | 1 | 105 | 2 | 36 | >10 |
| Methyl thioglycolate | 1 | 105 | 2 | 80 | >10 |
| No additive (control) | 1 | 105 | 2 | 5 | |

Example 6

Five (5) grams of tetraoxane purified by sublimation was dissolved in cyclohexene at 120° C. Carbon disulfide was added to said solution in an amount of 1% of the tetraoxane, and the mixture was heated for 1 hour so as to effect polymerization. After several minutes of induction period, the polymer began to precipitate. The polymerization yield and viscosity of the polymer were respectively 97% and 1.4 when 1.5 ml. of cyclohexane was used; and 68% and 1.2 when 5 ml. thereof was used.

Example 7

To 1 gram of crystalline tetraoxane purified by sublimation, diethyl sulfate was admixed in an amount of 5% of tetraoxane. The mixture was sealed in a glass ampoule. Each example was polymerized in a heating bath under the conditions shown in Table 6. After polymerization the reaction mixture was washed with acetone so as to remove unreacted tetraoxane and the additive (polymerization initiator). The purified polymer was dried in vacuum at room temperature for 48 hours. The product was a white crystalline substance. The polymerization conditions and the results are shown in Table 6.

TABLE 6

| Polymerization conditions | | Results | |
|---|---|---|---|
| Temp. (° C.) | Time (hrs.) | Yield (percent) | Viscosity [η] |
| 90 | 2 | 69 | 0.4 |
| 105 | 1 | 79 | 0.4 |
| 105 | 2 | 96 | 0.2 |
| 105 | 4 | 84 | 0.2 |
| 120 (solid phase) | 2 | 69 | 0.2 |
| 120 (liquid phase) | 2 | 60 | 0.2 |

Example 8

To 1 gram of crystalline tetraoxane purified by sublimation dimethyl sulfone and dimethyl sulfoxide were respectively admixed and each mixture was sealed in a glass ampoule and heated at 105° C., for 2 hours. The respective reaction mixture was treated as in Example 7. A white crystalline polymer was obtained. The polymerization conditions and results are shown in Table 7. Irradiation was carried out prior to polymerization at room temperature using gamma rays from Co–60.

TABLE 7

| Polymerization conditions | | | Results | |
|---|---|---|---|---|
| Additive | Amount (percent) | Irradiation dose (rad.) | Yield (percent) | Viscosity [η] |
| Dimethylsulfone | 4 | 1×10⁶ | 94 | 0.8 |
| Do | 4 | No irradiation | 2 | |
| Dimethylsulfoxide | 4 | 1×10⁶ | 60 | 0.6 |
| Do | 4 | No irradiation | 1 | |
| No additive (control) | | 1×10⁶ | 48 | 0.9 |

Example 9

To 1 gram of crystalline tetraoxane purified by sublimation, dimethyl sulfite or glycol sulfite was added respectively and the mixture was sealed in a glass ampoule and was heated in a heating bath for polymerization after irradiation with gamma rays as shown in Table 8. After polymerization, the reaction mixture was treated as in Example 7, and a white crystalline polymer was obtained. The polymerization conditions and results are shown in Table 8.

Example 10

To 1 gram of crystalline tetraoxane purified by sublimation, a 1% cyclohexane solution of each of the following additives was admixed. The mixture was sealed in a glass ampoule and was polymerized. The polymerization conditions and results are shown in Table 9.

TABLE 9

| Polymerization conditions | | | | Results | |
|---|---|---|---|---|---|
| Additive | Amount of solution (μl.) | Temp. (° C.) | Time (hr.) | Yield (percent) | Viscosity [η] |
| Dimethyl sulfite | 1 | 105 | 2 | 10 | 0.9 |
|  | 1 | ¹120 | 1 | 5 |  |
| Dimethyl sulfate | 1 | 105 | 2 | 71 | 0.7 |
|  | 1 | ¹120 | 1 | 50 | 0.5 |

¹ Liquid phase.

Example 11

One (1) gram of tetraoxane purified by sublimation was put in a glass ampoule, and various amounts of ethylene sulfide, propylene sulfide and cyclohexene sulfide were respectively admixed to said tetraoxane, and the ampoule of the respective mixture was sealed in air. The sealed ampoules were subjected to irradiation of 1×10⁵ rad. at −78° C., and then were polymerized in a heating bath of 105° C. for 24 hours. The respective reaction mixture was washed with acetone so as to remove the unreacted tetraoxane and additive, and dried in a vacuum drier for more than 24 hours. The results are shown in Table 10.

TABLE 10

| Additive | Amount (percent) | Yield (percent) | K₂₂₂ | Viscosity [η] |
|---|---|---|---|---|
| Cyclohexene sulfide | 3 | 97 | 0.32 | 2.2 |
| Ethylene sulfide | 1 | 49 | 0.31 | 2.3 |
| Propylene sulfide | 1 | 84 | 0.25 | 2.8 |
| Cyclohexene sulfide | 1 | 99 | 0.22 | 3.1 |
| Ethylene sulfide | 0.1 | 99 | 0.17 | 4.3 |
| Propylene sulfide | 0.1 | 99 | 0.47 | 2.7 |
| Cyclohexene sulfide | 0.1 | 98 | 0.21 | 4.3 |
| do | ¹0.01 | ~100 | 0.68 | 2.2 |
| No additive (control) | | 50 | 1.16 | 0.6 |

¹ Used as 1% solution in 1,4-dioxane.

TABLE 8

| Polymerization conditions | | | | | Results | |
|---|---|---|---|---|---|---|
| Additive | Amount of additive (percent) | Dose (rad.) | Time (hrs.) | Temp. (° C.) | Yield (percent) | Viscosity [η] |
| Dimethyl sulfite | 3 | | 2 | 60 | 1.0 | |
|  | 0.01 | | 2 | 105 | 98 | 0.9 |
|  | 0.1 | | 2 | 105 | 98 | 0.8 |
|  | 1 | | 2 | 105 | 92 | 0.5 |
|  | 3 | | 2 | 105 | 100 | 0.3 |
|  | 3 | | 1 | 105 | 57 | 0.5 |
|  | 3 | | 2 | ᵃ120 | 92 | 0.4 |
|  | 1 | | 2 | ᵇ120 | 80 | 0.6 |
|  | 3 | | 24 | 105 | ~100 | 0.8 |
| Glycol sulfite | 0.1 | 10⁵ | 2 | 105 | 99 | 0.7 |
|  | 3 | 10⁵ | 2 | 105 | 100 | 0.5 |

ᵃ Solid phase.
ᵇ Liquid phase.

Example 12

Example 11 was repeated using various thiiranes. The amount of addition was 0.1% and irradiation was carried out in various doses. The results are shown in Table 11.

TABLE 11

| Additive | Dose (rad.) (−78° C.) | Yield (percent) | $K_{222}$ | Viscosity $[\eta]$ |
|---|---|---|---|---|
| Cyclohexene sulfide | $10^4$ | ~100 | 0.28 | 5.6 |
| Ethylene sulfide | $10^5$ | ~100 | 0.20 | 3.5 |
| Propylene sulfide | $10^5$ | ~100 | 0.40 | 2.4 |
| Cyclohexene sulfide | $10^6$ | ~100 | 0.20 | 3.3 |
| ....do | $10^7$ | ~100 | 0.65 | 1.1 |
| No additive (control) | $10^7$ | 77 | 1.16 | 0.3 |

Example 13

Example 11 was repeated using cyclohexene sulfide in an amount of 0.1%. Irradiation was carried out with dose of $10^6$ rad. at −78° C., and then the reaction system was kept in a heating bath of 105° C. for various lengths of time. The results are shown in Table 12.

TABLE 12

| | Yield (percent) | $K_{222}$ | $[\eta]$ |
|---|---|---|---|
| Polymerization time (hr.): | | | |
| 1 | 94 | 0.22 | 4.0 |
| 4 | 99 | 0.20 | 4.0 |
| 8 | ~100 | 0.22 | 4.1 |
| 16 | ~100 | 0.21 | 4.0 |
| 48 | ~100 | 0.54 | 3.5 |

Example 14

Example 11 was repeated with varied irradiation conditions and atmosphere of the polymerization system. The mixture was kept at 105° C. for 24 hours. The polymerization conditions and results are shown in Table 13.

TABLE 13

| Polymerization conditions | | | Results | | |
|---|---|---|---|---|---|
| Additive and amount (percent) | Atmosphere | Irradiation condition | Dose (rad.) | Yield (percent) | $K_{222}$ | $[\eta]$ |
| Cyclohexene sulfide, 0.1 | In air | Mixture of tetraoxane and additive was sealed in an ampoule and irradiated at −78° C. | $10^5$ | 99 | 0.23 | 5.0 |
| | In oxygen | do | $10^5$ | ~100 | 0.45 | 4.1 |
| | In air | do | $10^5$ | 99 | 0.22 | 3.0 |
| Propylene sulfide, 0.5 | do | Propylene sulfide was added to tetraoxane which had been irradiated. | $10^5$ | 99 | 0.25 | 2.1 |

Example 15

Example 11 was repeated, but the amount of addition of cyclohexene sulfide was 0.1%, irradiation dose was $10^5$ rad. (at −78° C.) and the reaction mixture was kept in a heating bath of various temperatures for 24 hours. The results are shown in Table 14.

TABLE 14

| | Yield (percent) | $K_{222}$ | $[\eta]$ |
|---|---|---|---|
| Temp. of heating bath (° C.): | | | |
| 90 | 45 | 0.76 | 2.1 |
| 110 | 99 | 0.41 | 3.0 |
| 130 | 99 | 0.78 | 1.8 |

Example 16

One gram of tetraoxane was put in a glass ampoule, and 3% cyclohexane sulfide was admixed thereto and the ampoule was sealed in air. The ampoule was subjected to gamma radiation at the dose rate of $5 \times 10^3$ rad./hr. for 20 hours while it was kept in a heating bath of 100° C. (in-source polymerization). After polymerization, the mixture was treated as in Example 11 and a white polymer was obtained. The yield was 99%, $K_{222}$ was 0.80%/min. and $[\eta]$ was 1.5.

Example 17

Example 11 was repeated with some modifications. One (1) percent propylene sulfide was admixed to tetraoxane and the mixture was sealed in a glass ampoule. It was subjected to irradiation of ultraviolet rays from a high pressure mercury lamp for 1 hour and was then kept in a heating bath of 100° C. The polymerization yield was 76%, $K_{222}$ was 0.65 $[\eta]$ was 2.0. When propylene sulfide was not added, no polymer was obtained.

Example 18

One gram of tetraoxane was put in a glass ampoule, and 2% cyclohexene sulfide was admixed thereto. The mixture was melted in a heating bath of 130° C. and kept for 24 hours for polymerization. After polymerization, the reaction mixture was treated in the same way as in Example 11. In the latter three experiments, the cyclohexane solutions of tetraoxane were prepared and then cyclohexene sulfide was added as specified in Table 14-b. One of the samples in a glass ampoule was irradiated. These results are shown in Table 14-b.

TABLE 14-b

| Polymerization conditions | | | | | Results | | |
|---|---|---|---|---|---|---|---|
| Amount of cyclohexene added (percent) | Amount of cyclohexene sulfide (percent) | Dose (rad.) | Temp. (° C.) | Time (hr.) | Yield (percent) | $K_{222}$ | $[\eta]$ |
| 100 | 2 | | 130 | 24 | 99 | 0.76 | 0.7 |
| 100 | 2 | | 105 | 24 | 52 | 0.40 | 0.9 |
| 100 | 0.1 | | 100 | 2 | 24 | 0.80 | 2.9 |
| 100 | 0.1 | a $10^5$ | 100 | 1 | 65 | 0.56 | 1.2 | a In-source.

Reference example

One (1) gram of trioxane was put in a glass ampoule, 0.5% ethylene sulfide was admixed thereto, and the ampoule was sealed in air. It was subjected to irradiation of $10^6$ rad. at −78° C. and then kept in a 55° C. heating bath for 24 hours for polymerization. The polymerization yield was 55%, $K_{222}$ was 0.90 and $[\eta]$ was 1.8. When an episulfide was added and no irradiation was employed, no polymer was obtained. When polymerization was carried out by irradiation without episulfide added, the polymerization yield was 55% and $K_{222}$ was 1.32 and $[\eta]$ was 1.9.

Example 19

One (1) gram of tetraoxane purified by sublimation was put in a glass ampoule, methyl thiocyanate, ethyl thiocyanate or benzyl thiocyanate were respectively added to the tetraoxane and the ampoule was sealed in air. The ampoules were kept in a 105° C. heating bath for polymerization. After polymerization, the reaction mixture was washed with acetone so as to remove the unreacted tetraoxane and additive, and the recovered polymer was dried in vacuum for 24 hours. The polymerization conditions and results are shown in Table 15.

Example 22

Example 20 was repeated with some modifications. That is, the amount of addition of ethyl thiocyanate, atmosphere of the polymerization system and irradia-

TABLE 15

| Additive | Polymerization conditions | | | Results | | |
|---|---|---|---|---|---|---|
| | Amount (percent) | Time (hr.) | Dose | Yield (percent) | $K_{222}$ | $[\eta]$ |
| Methyl thiocyanate | 0.1 | 2 | | 42 | 0.42 | 3.5 |
| Do | 0.1 | 2 | $10^5$ rad. (−78° C.) | 99 | 0.57 | 4.1 |
| Ethyl thiocyanate | 0.1 | 4 | do | 99 | 0.51 | 3.2 |
| Methyl thiocyanate | 1 | 2 | | 48 | 0.41 | 3.4 |
| Do | 1 | 2 | $10^5$ rad. (−78° C.) | ~100 | 0.54 | 3.5 |
| Ethyl thiocyanate | 1 | 4 | do | ~100 | 0.25 | 3.9 |
| Benzyl thiocyanate | 1 | 4 | do | 71 | 0.42 | 2.8 |
| Methyl thiocyanate | 3 | 2 | | 56 | 0.40 | 3.2 |
| Do | 3 | 2 | $10^5$ rad. (−78° C.) | 99 | 0.50 | 3.8 |
| Ethyl thiocyanate | 3 | 4 | do | 99 | 0.09 | 4.3 |
| Methyl thiocyanate | 5 | 2 | | 77 | 0.40 | 3.1 |
| Ethyl thiocyanate | 5 | 4 | $10^5$ rad. (−78° C.) | 98 | 0.23 | 4.8 |
| No additive (control) | | 24 | do | 50 | 1.10 | 0.6 |

Example 20

Example 19 was repeated with some modifications. Ethyl thiocyanate was added in an amount of 3%, and the dose of gamma radiation (Co-60) was varied. The mixture was irradiated at −78° C. and then was kept at 105° C. for 4 hours. When the dose was $10^4$ rad., polymerization yield was 99%, $K_{222}$ was 0.20 and $[\eta]$ was 2.8; when $10^6$ rad., the yield was about 100°, $K_{222}$ was 0.18 and $[\eta]$ was 2.1.

Example 21

Example 20 was repeated with further modification. The irradiation dose of gamma radiation (Co-60) was $10^6$ rad. and the polymerization time was varied. The results are shown in Table 16. Incidentally, in this example when no ethyl thiocyanate was added, the polymerization yield after 24 hours was 60%, $K_{222}$ was 1.15, and $[\eta]$ was 0.4.

TABLE 16

| Time (hr.) | Yield (percent) | $K_{222}$ | $[\eta]$ |
|---|---|---|---|
| 1 | 99 | 0.20 | 2.1 |
| 2 | 99 | 0.20 | 2.1 |
| 8 | ~100 | 0.18 | 2.1 |
| 24 | ~100 | 0.17 | 2.3 |

Example 21-b

Example 19 was repeated with some modifications. Ethyl isothiocyanate was added, the dose of gamma rays (Co-60) was $10^6$ rad. and the polymerization time was varied. The results are shown in Table 16-b.

TABLE 16-b

| Amount of additive (percent) | Time (hr.) | Dose (rad.) | Yield (percent) | $K_{222}$ | $[\eta]$ |
|---|---|---|---|---|---|
| 0.1 | 4 | $10^6$ | 80 | 0.70 | 3.5 |
| 3.0 | 8 | $10^6$ | 75 | 0.21 | 2.9 |
| 3.0 | 24 | $10^6$ | 83 | 0.18 | 2.9 |
| 3.0 | 72 | | 8 | | 1.9 | tion conditions were varied. The irradiation was effected with the dose of $10^5$ rad. at −78° C. and polymerization was carried out in a 105° C. heating bath for 4 hours. The results are shown in Table 17.

TABLE 17

| Polymerization conditions | | | Results | | |
|---|---|---|---|---|---|
| Ethyl thiocyanate (percent) | Atmosphere | Irradiation condition | Yield (percent) | $K_{222}$ | $(\eta)$ |
| 1.0 | Air | Tetraoxane containing thiocyanate was sealed in ampoule and then irradiated. | 99 | 0.24 | 3.9 |
| 1.0 | Vacuum | | 30 | 0.58 | 1.4 |
| 3.0 | Air | | 99 | 0.15 | 4.3 |
| 3.0 | Air | Tetraoxane was irradiated and then thiocyanate was added. | 99 | 0.19 | 2.3 |
| 5.0 | Air | | 98 | 0.22 | 2.2 |

Example 23

Example 20 was repeated with a further modification. Three (3) percent ethyl thiocyanate was added to tetraoxane and the mixture was irradiated in a sealed ampoule with dose of $10^5$ rad. at −78° C. Polymerization was carried out for 4 hours at various temperatures. The results are shown in Table 18.

TABLE 18

| | Yield (percent) | $K_{222}$ | $[\eta]$ |
|---|---|---|---|
| Temp. of heating bath (° C.): | | | |
| 90 | 95 | 0.30 | 4.5 |
| 110 | 99 | 0.14 | 2.7 |
| 140 | 90 | 0.55 | 1.7 |

Example 24

One (1) gram of tetraoxane was put in a glass ampoule, ethyl thiocyanate was admixed thereto and the ampoule was sealed. The ampoule was kept in a 90° C. heating bath while being subjected to gamma rays at the dose rate of $10^6$ rad./hr. for one hour (in-source polymerization). After polymerization, the reaction mixture was treated as in Example 19. The results are shown in Table 19.

TABLE 19

| | Yield (percent) | $K_{222}$ | $[\eta]$ |
|---|---|---|---|
| Amount of ethyl thiocyanate (percent): | | | |
| 1 | 49 | 0.55 | 0.6 |
| 3 | 43 | 0.50 | 0.6 |
| 5 | 32 | 0.55 | 0.5 |
| No additive (control) | 68 | 1.16 | 0.5 |

Example 25

Example 20 was repeated with some modifications. Instead of gamma radiation, ultraviolet rays from a high pressure mercury lamp (Toshiba HLS-4002) were employed. Three (3) percent ethyl thiocyanate was added to 1 gram of tetraoxane in a glass ampoule and the ampoule was sealed. The polymerization was carried out in a 100° C. heating bath for one hour. The polymerization yield was 80%, $K_{222}$ was 0.43 and $[\eta]$ was 2.0. When no ethyl thiocyanate was used, no polymer was obtained.

Example 26

One (1) gram of tetraoxane was put in a glass ampoule, 3% ethylthiocyanate was added thereto. Polymerization was carried out in the liquid phase. The polymerization conditions and results are shown in Table 20.

TABLE 20

| Polymerization conditions | | | | Results | | |
| --- | --- | --- | --- | --- | --- | --- |
| Solvent | Irradiation dose | Temp. (° C.) | Time (hr.) | Yield (percent) | $K_{222}$ | $[\eta]$ |
| No solvent | | 140 | 4 | 86 | 0.47 | 2.3 |
| 100% cyclohexane | $10^5$ rad (in-source polymerization). | 100 | 1 | 55 | 0.57 | 1.2 |

Example 27

One (1) gram tetraoxane was put in a glass ampoule, each of the organic sulfur compounds as specified in Table 21 was admixed thereto, and the ampoule was sealed in air. Polymerization was carried out in a 105° C. heating bath after the reaction mixture was irradiated with gamma radiation as indicated in Table 21. The polymerization conditions and results are summarized in Table 21. The polymer obtained by using trimethylene trisulfone is superior in thermal stability, that is, $K_{222}$ was 0.08 percent/min. When trioxane admixed with 5% trimethylene trisulfone was polymerized in the solid phase at 55° C. or in the liquid phase at 130° C., no polymer was obtained.

TABLE 21

| Polymerization conditions | | | | | | Results | | |
| --- | --- | --- | --- | --- | --- | --- | --- | --- |
| Phase | Additive | Amount (percent) | Dose | Temp. (° C.) | Time (hr.) | Yield (percent) | $[\eta]$ | |
| Solid | Dihydrothiophene-1-oxide | 3.0 | $1\times10^5$ rad | 105 | 24 | 95 | 1.8 | |
| Do | do | 3.0 | | 105 | 24 | 15 | 1.1 | |
| Do | Tetrahydrothiophene-1-oxide. | 2.0 | $1\times10^5$ rad | 105 | 24 | 33 | 1.5 | |
| Do | do | 2.0 | | 105 | 24 | 10 | 1.0 | |
| Do | Tetrahydrothiophene-1-dioxide. | 1.0 | $1\times10^5$ rad | 105 | 24 | ~100 | 1.7 | |
| Do | do | 1.0 | | 105 | 24 | 20 | 1.3 | |
| Liquid | Trimethylene trisulfone (solution in p-dioxane). | 5.0 | | 105 | 10 | 89 | 3.1 | |
| Solid | No additive (control) | | $1\times10^5$ rad | 105 | 24 | 58 | 0.4 | |
| Liquid | do | | do | 105 | 24 | <1 | | |

Example 28

To 1 gram of tetraoxane purified by sublimation, an additive which had been irradiated at −78° C. with dose of $16^6$ rad. was added. The polymerization was carried out in a heating bath of 105° C. After polymerization, the reaction mixture was washed with acetone so as to remove unreacted tetraoxane and additive. The residual white polymer was dried in vacuum for 24 hours. The polymerization conditions and results are shown in Table 22.

TABLE 22

| Polymerization conditions | | | Results | | |
| --- | --- | --- | --- | --- | --- |
| Additive | Amount (percent) | Time (hr.) | Yield (percent) | $K_{222}$ | $[\eta]$ |
| Ethyl thiocyanate | 5.0 | 4 | 98 | 0.2₂ | 2.4 |
| Do | 3.0 | 4 | 98 | 0.2₄ | 3.1 |
| Do | 3.0 | 8 | 99 | 0.1₆ | 2.7 |
| Ethylene sulfide | 0.1 | 24 | 24 | 0.2₃ | 2.3 |
| Propylene sulfide | 1.0 | 24 | 25 | 0.2₃ | 2.3 |
| Cyclohexene sulfide | 0.1 | 4 | 49 | 0.3₁ | 3.1 |
| Do | 3.0 | 4 | 96 | 0.3₅ | 3.8 |
| Sulfur (n-hexane solution) | 0.03 | 4 | 19 | | 1.4 |
| Dimethyl sulfoxide | 3.0 | 8 | 36 | | 2.1 |
| Dimethyl sulfone (n-hexane solution) | 0.001 | 24 | 23 | | 1.8 |
| Thiophene | 5.0 | 4 | 81 | 0.8₁ | 1.3 |
| Do | 3.0 | 8 | 89 | 0.8₄ | 1.7 |
| Tetramethylene sulfone | 3.0 | 24 | 41 | | 1.2 |

What is claimed is:

1. A process for polymerizing tetraoxane which comprises admixing to tetraoxane, at least one additive selected from sulfur and an organic sulfur compound selected from the group consisting of a thioaldehyde, a thioketone, a thioalcohol, a thiocarbonic anhydride, a thioether including thiiranes, a thiocarbonic ester, a thioamide, a thiourea, a thiourea derivative, a thiocyanate, an isothiocyanate, an alkylxanthogenate, a sulfate, a sulfite, an alkyl sulfone, an alkylsulfoxide, a sulfonium compound, a thiophene-derivative-s-oxide, a dithiorane-derivative-s-oxide, an oxathian-derivative-s-oxide, and a trithianoxide in an amount of $10^{-4}$–10% by weight of the tetraoxane and polymerizing the mixture at a temperature ranging from 30° to 150° C.

2. A process as set forth in claim 1, in which polymerization is carried out by means of an ionizing radiation or ultraviolet rays.

3. A process as set forth in claim 1, in which tetraoxane is irradiated by an ionizing radiation or ultraviolet rays, and then an additive is added to the irradiated tetraoxane, and the mixture is polymerized in solid phase.

4. A process as set forth in claim 1, in which an additive is irradiated by an ionizing radiation or ultraviolet rays and then added to tetraoxane, and the mixture is polymerized in solid or liquid phase.

5. A process as set forth in claim 1, in which polymerization is carried out in solid phase.

6. A process as set forth in claim 1, in which the mixture of tetraoxane and an additive is irradiated by an ionizing radiation or ultraviolet rays and then polymerized in solid phase.

7. A process as set forth in claim 1, in which at least one organic compound selected from the group consisting of ethylene sulfide, propylene sulfide, 1-butene sulfide, isobutene sulfide, 2-butene sulfide, trimethylethylene sulfide, tetramethylethylene sulfide, cyclopentene sulfide, cyclohexene sulfide, 4-methylcyclohexene sulfide, cycloheptene sulfide, cyclooctene sulfide, styrene sulfide, 3-mercaptopropylene sulfide, and 3-chloropropylene sulfide, is used as thiiranes.

8. A process as set forth in claim 7, in which polymerization is carried out by means of an ionizing radiation or ultraviolet rays.

9. A process as set forth in claim 1, in which at least one thiocyanate selected from the group consisting of methyl thiocyanate, ethyl thiocyanate, propyl thiocyanate, isopropyl thiocyanate, butyl thiocyanate, isobutyl thiocyanate, amyl thiocyanate, isoamyl thiocyanate, allyl thiocyanate, benzyl thiocyanate, and phenyl thiocyanate, is used.

10. A process as set forth in claim 9, in which polymerization is carried out by means of an ionizing radiation or ultraviolet rays.

11. A process as set forth in claim 1, in which trimethylenetrisulphoxide or trimethylenetrisulfone is used as a trithianoxide.

12. A process as set forth in claim 1, in which at least one isothiocyanate selected from the group consisting of methyl isothiocyanate, ethyl isothiocyanate, n-propyl isothiocyanate, isopropyl isothiocyanate, n-butyl isothiocyanate, benzyl isothiocyanate, and phenyl isothiocyanate, is used.

13. A process as set forth in claim 12, in which polymerization is carried out by means of an ionizing radiation or ultraviolet rays.

14. A polyoxymethylene produced by the process which comprises polymerizing tetraoxane in the presence of at least one additive selected from sulfur and an organic sulfur compound selected from the group consisting of a thioaldehyde, a thioketone, a thioalcohol, a thiocarbonic anhydride, a thioether including thiiranes, a thiocarbonic ester, a thioamide, a thiourea, a thiourea derivative, a thiocyanate, an isothiocyanate, an alkylxanthogenate, a sulfate, a sulfite, an alkyl sulfone, an alkylsulfoxide, a sulfonium compound, a thiophene-derivative-s-oxide, a dithiorane-derivative-s-oxide, an oxathian-derivative-s-oxide, and a trithianoxide in an amount of $10^{-4}$–10% by weight of the tetraoxane at a temperature ranging from 30° to 150° C.

15. A polyoxymethylene as set forth in claim 14 in which polymerization is carried out by means of an ionizing radiation or ultraviolet rays.

16. A polyoxymethylene as set forth in claim 14 in which polymerization is carried out by means of an ionizing radiation or ultraviolet rays.

References Cited

UNITED STATES PATENTS 3,347,764  10/1967  Matsumoto et al. __ 204—159.21
3,020,064   2/1962  Behrends et al. ___ 260—67 FP

OTHER REFERENCES

Free Radical Involved Cationic Polymerization, Chem. & Eng. News, Sept. 6, 1966, pp. 40 and 41.

MURRAY TILLMAN, Primary Examiner

R. B. TURER, Assistant Examiner

U.S. Cl. X.R.
260—67 FP